Feb. 17, 1959 R. A. NEAVERSON 2,873,869
LOAD HOISTING APPARATUS FOR VEHICLES
Filed Dec. 15, 1955 4 Sheets-Sheet 2
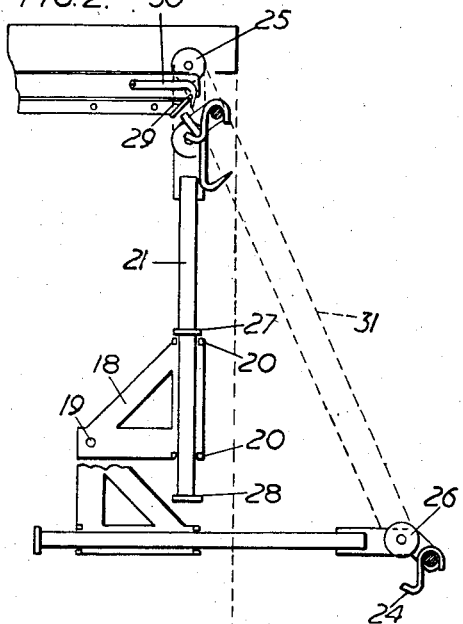
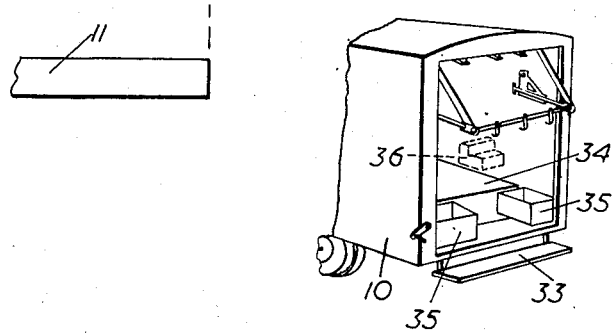
Inventor
Rowland Alec Neaverson
By Michael S. Struk
agt

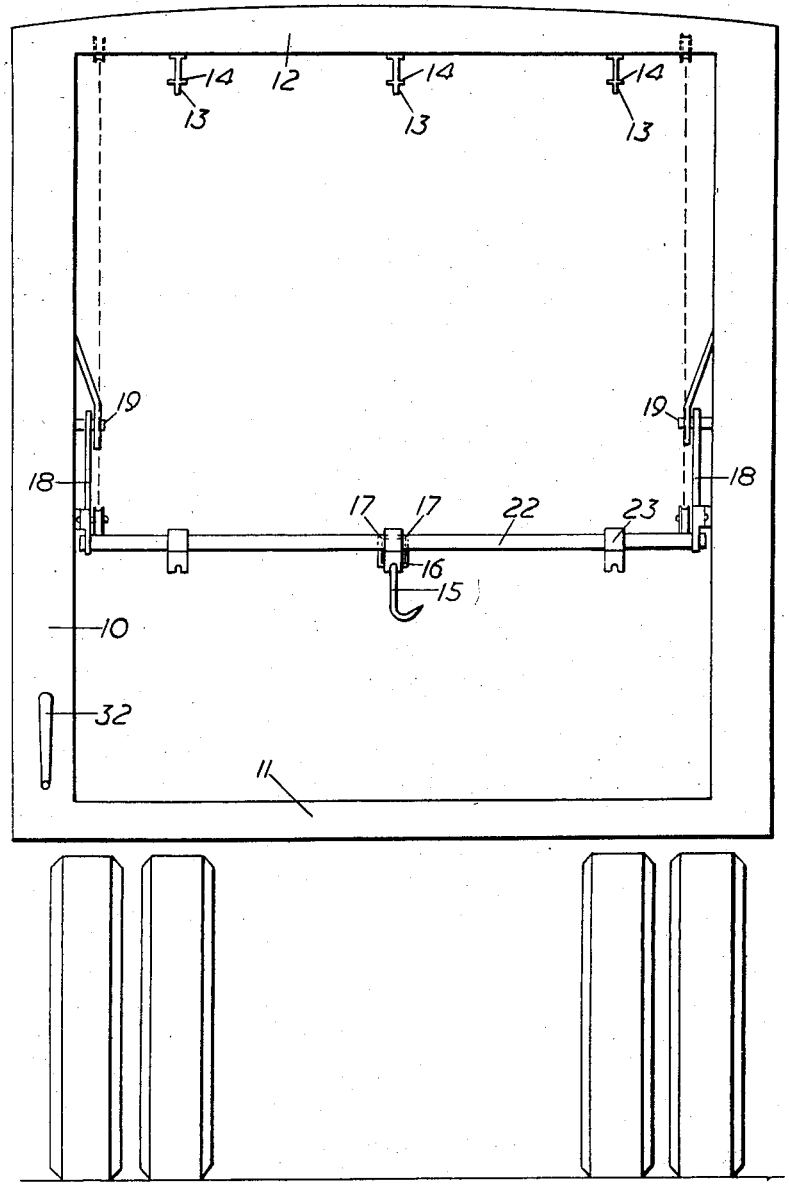

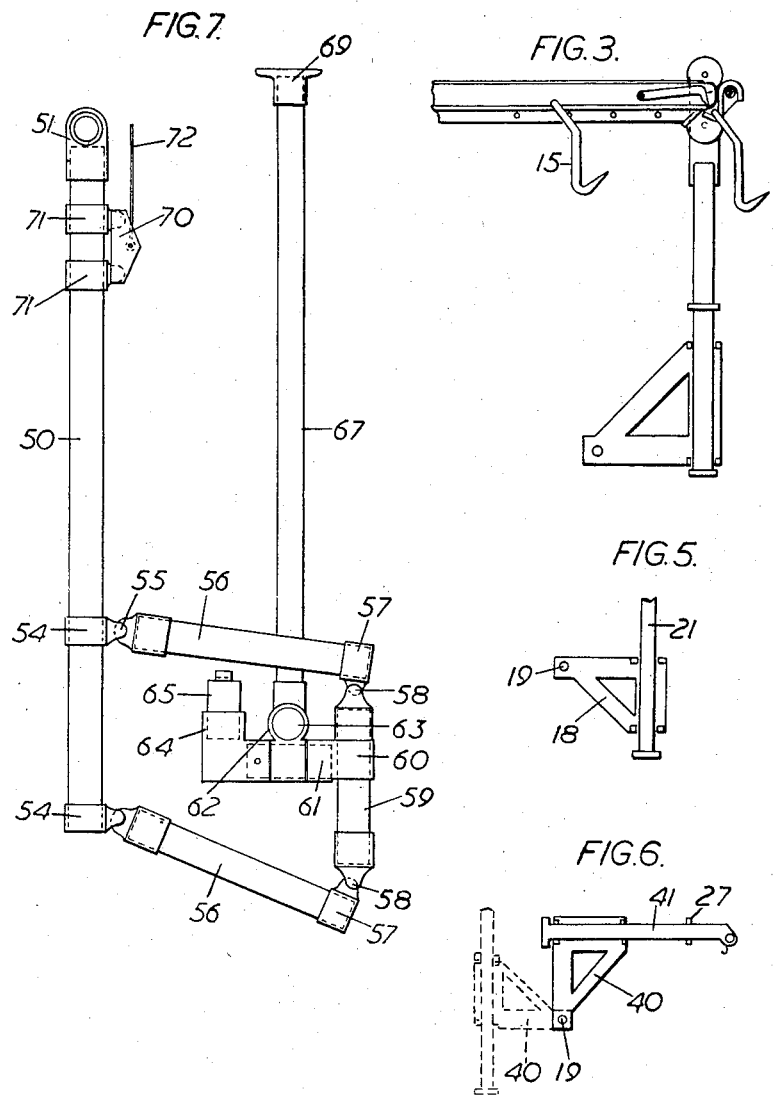

Feb. 17, 1959     R. A. NEAVERSON     2,873,869
LOAD HOISTING APPARATUS FOR VEHICLES
Filed Dec. 15, 1955     4 Sheets-Sheet 4
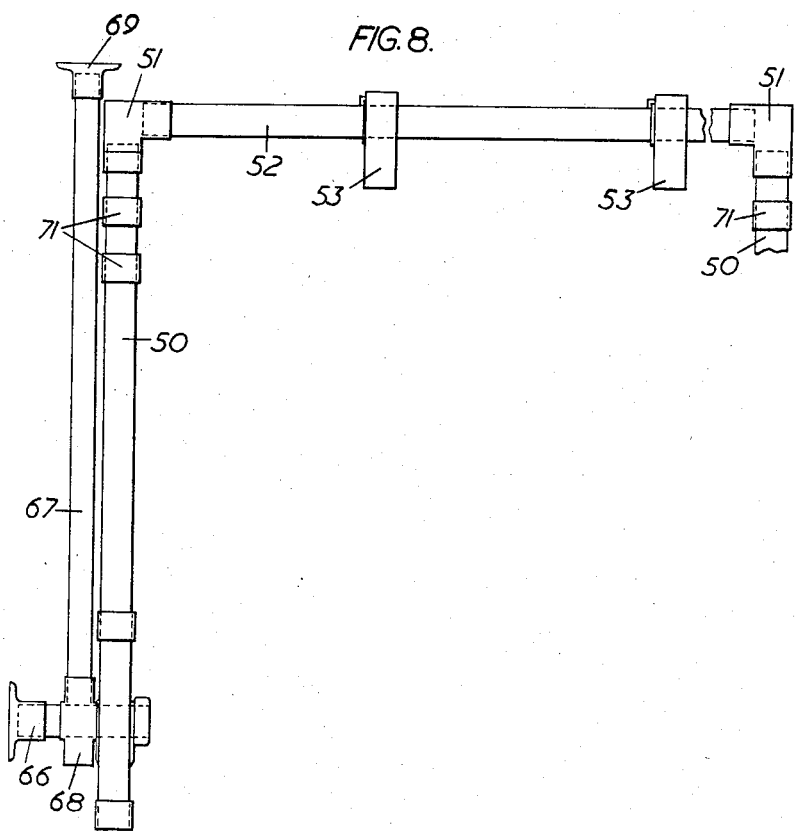

United States Patent Office 2,873,869
Patented Feb. 17, 1959

2,873,869

LOAD HOISTING APPARATUS FOR VEHICLES

Rowland Alec Neaverson, Leicester, England

Application December 15, 1955, Serial No. 553,375

7 Claims. (Cl. 214—77)

This invention is for improvements in or relating to load hoisting apparatus and to vehicle arrangements in connection with which such hoisting apparatus may be used. In its broadest aspects the invention is applicable to load handling at storage premises or other stationary structures and also to loading and unloading arrangements for transportable goods receiving carriers such as vehicle bodies and containers adapted for transfer from one vehicle to another. The invention may further be applied to other uses such as to the control of movement of various articles during processing thereof.

It is one object of the invention to facilitate the control and positioning in convenient manner of articles (particularly relatively bulky or heavy articles) during their transfer from one position to another for example as in the loading and unloading of goods. Another object is to improve the accommodation arrangements in the neighborhood of the loading station of goods receiving carriers.

In accordance with the invention there is provided apparatus comprising a lever arrangement mounted to swing about a substantially horizontal axis, an arm supported by the lever arrangement so as to extend approximately at right angles to said axis in a position displaced therefrom and in an attitude disposed transversely of the axis and arm and operating means for swinging said lever and arm assembly to move the arm between approximately horizontal and upstanding attitudes. The arm conveniently carries article supporting means at one end which extends above the said axis, when the arm is upstanding. Thus by manipulation of the operating means an article on the article supporting means can be raised or lowered and at the same time moved forwardly and rearwardly thus giving controlled movements which are particularly useful in the handling of loads or for other purposes. The apparatus in fact serves as a guiding and controlling means for a suspended article ensuring its controlled transfer from one point to another in a convenient manner. Preferably the said lever arrangement comprises a mounting permitting movement of the said arm in the direction of its length relatively to the said axis, the extent of its slidable movement being desirably limited in a required manner to enable articles carried by the supporting means to be raised or lowered when the arm is upstanding.

In a preferred form the lever arrangement comprises two levers or lever devices pivoted about a common axis and spaced apart in the direction of said axis with each lever or lever device carrying an arm as aforesaid and with the said arms arranged parallel with their ends remote from said axis connected by a crossbar on which the article supporting means is mounted. Such cross bar may carry a plurality of article supporting means at spaced intervals along it. A construction of this kind is readily applicable to a hoisting arrangement for handling goods to be loaded into or unloaded from a vehicle body or transportable container the two levers being pivoted at suitable positions on the inner side walls of the body or container close to a loading aperture so that when the arms are lowered to an approximately horizontal attitude they project through the loading aperture to a position outside the body or container and when swung to an upstanding attitude they extend within the body or container. Goods can thus be applied to the article supporting means at a convenient low level outside the body or container and then hoisted by the apparatus into the body or container, the swinging movement of the arms serving both to raise the goods and to move them into the body or container. By having the arms slidable endwise in bearings on the levers the arms and crossbar can then be raised or lowered to raise or lower the goods as may be required. Conveniently the operating means comprise a haulage rope or chain anchored at one end to the arm assemblies at or near the crossbar and passing over a guide pulley or sprocket immediately above the position to which the arms are raised. Thus by successive operation of the rope or chain the arms and crossbar may first be swung upwardly and then raised or lowered vertically.

The apparatus as last referred to may further have a useful application in connection with the processing of goods in a plant in which goods are transported from station to station by overhead conveyors. The article supporting means may be used to lower one or more articles and when lowered to hold them at a convenient low level for processing, e. g. for painting or enamelling, and by means of the apparatus the article may afterwards be raised to transfer them to the overhead conveyors.

For certain application in loading hoisting only a small horizontal displacement is needed and in this case it is convenient to have the arm or arms so positioned on the lever arrangement as to extend below the said pivotal axis when in lowered attitude. The arm or arms may however be positioned to extend above said axis when in lowered attitude particularly when a greater horizontal displacement is required.

The invention is particularly useful in connection with a meat transporter in which it is very desirable to ensure that carcasses are handled conveniently for support on overhead rails within the body or container without risk of contamination by being moved in contact with the floor of the body or container. In this connection the invention enables use to be made of space at floor level adjacent to the loading aperture at which position there may be provided receptacles for offal or the like. Normally the floor space adjacent to the loading aperture is needed as a loading platform providing footholds on which porters stand when loading and unloading carcasses. By the apparatus of the present invention the need for such foot holds is avoided and the space adjacent to the apertures at or below floor level can therefore be utilized for one or more receptacles as aforesaid which may be placed alongside a narrow stepped footway or themselves be stepped to form a convenient means of entry to the body or container.

Certain preferred ways of carrying out the invention will now be described by way of example with reference to illustrations given in the accompanying drawings in which:

Figure 1 is a rear end view of a meat transporter vehicle;

Figure 2 is a cross sectional view in side elevation of the rear or loading end of the vehicle;

Figure 3 is a detail view corresponding to a portion of Fig. 2;

Figure 4 is a rear perspective view showing the arrangement of the loading end of a vehicle such as is illustrated in Figs. 1 to 3;

Figures 5 and 6 are views illustrating modified arrangement of mechanism;

Figure 7 is a side view of a portion of a further modified form of hoisting apparatus, and Figure 8 is an end view of parts of the apparatus shown in Figure 7.

In Fig. 1 the vehicle is adapted for use as a meat transporter and has a body 10 having a floor 11 and roof 12. From the roof are supported a plurality (3 are shown) of spaced rails 13 parallel to the sides for supporting carcasses slung on hooks which are shaped to ride on flanges 14 of the rails 13. The form of hook employed is conveniently of the same shape as shown in Figs. 5 and 6 of specification No. 686,183. Such hooks are indicated in the drawings and each has a lower cross bar 16 and an interrupted upper cross bar formed by inwardly directed portions 17 which are adapted to slide on the flanges 14. In an alternative form of hook the hook proper is swivelled on the centre of the lower end of a device as shown in Fig. 7 of specification No. 686,183.

In accordance with the invention there is provided an arrangement of levers 18 pivoted at 19 on each side internally of the vehicle body 10, each lever being of triangular form as shown more clearly in Fig. 2, the pivot 19 being near one of its angles and the opposite side of the lever providing an extended bearing formed by supports 20 for an arm or rod 21 slidable there along. Rods 21 disposed one on each side of the vehicle support between them a cross bar 22 on which are mounted at intervals corresponding to the positions of the rails 13 clips 23 on which the hooks 15 may be supported, the clips having as shown in Fig. 2 a divided depending hook formation on which the cross bar 16 may engage with the stem of the hook extending between the hooked parts of the clip 23. The assembly comprising the levers 18, rods 21 and cross bar 22 may be swung about the axis of the pivots 19 to move the rods 21 between substantially horizontal and substantially vertical attitudes, the complete pivoted assembly being conveniently operated by haulage ropes or chains 31 arranged one on each side and passing over upper pulleys or sprockets 25 and pulleys or sprockets 26 on the cross bar assembly to an anchorage near the top of the rear of the vehicle body. The ropes or chains 31 may be taken up or released by means on a winch which may be manually operated or operated by hydraulic means or by a winding drum driven by the vehicle engine or by an electric motor. On the rods 21 are stop members 27 which limit the sliding movement of the rods on the levers 18 and oppositely acting stops are formed by enlarged beads 28 on the extremities of the rods. The members 27 are desirably constructed to provide for their automatic engagement and disengagement with supports 20 as controlled by endwise movement of the rods 21 in the supports 20.

Articles such as carcasses supported on the hooks 15 are arranged to be hoisted to bring the cross bar portions 17 to the level of the flanges 14 of the rails 13 and the rearward ends of the rails are slanted as at 29 to direct the cross bar portions 17 over the ends of the flanges, a pivoted pawl or cam member 30 cooperating with the slanted portions 29 on each rail to cause the portions 17 to ride correctly on to the flanges and when positioned thereon to form an automatic stop to prevent their accidental removal from the rear ends of the rails 13.

When the pivoted assembly 18, 21, 22 is lowered as shown in the alternative position in Fig. 2 the hooked clips 23 project rearwardly outside the vehicle at a level which is convenient for loading manually from ground level. Carcasses with hooks 15 attached can thus be suspended from the clips 23 without requiring the porters to enter the vehicle. With the carcasses attached the rope or chain 31 is operated to haul the assembly upwardly until the rods 21 are in vertical attitude when the clips 23 support the hooks 15 with their cross bars 17 immediately below the rear ends of the rails 13 as shown in the upper part of Fig. 2. The rope or chain is then hauled still further causing the rods 21 and cross bar 22 to be raised by sliding movement of the rods 21 in their bearings in the levers 18 to cause the cross bar portions 17 to ride up the slanted ends 29 and by rocking the levers 30 to become directed on to the flanges 14. The carcasses can then be slid on the rails along the body of the vehicle as required to make room for further loading. The raised position of the rods 21 is shown in Fig. 3 which illustrates specifically the manner of unloading with the rods raised as shown. The pawl levers 30 are lifted by the clips 23 to permit a hook 15 to be slipped off the rail 13 causing its cross bar portions 17 to be engaged with the hooked portion of the clips 23. Release of the rope or chain 31 then permits the crossbar and rods to move downwardly to release pawl levers 30 and afterwards allows the whole pivoted assembly to rock downwardly about the pivots 19 to lower the carcasses to a convenient level for removal manually by the porters at the same time swinging the carcasses out of the body of the vehicle.

Figure 1 illustrates for example a hand lever 32 which may be turned to operate a manual winch for pulling and releasing the rope of chain 31. This may be located at any convenient position within the vehicle or projecting from the rear of the vehicle.

Figure 4 shows the rear part of a vehicle fitted with loading apparatus as aforesaid and shows an improved space saving arrangement which is made possible by the invention. At the rear of the body 10 is a pivoted rail board 33 which may be swung down to the position shown to act as a boarding step for entry into the vehicle body. Forwardly of the loading aperture at the rear of the vehicle is a raised floor 34 and between this floor and the rear of the vehicle the space may be utilised for accommodating receptacles 35, one or more on each side, in which offal or the like may be carried. Between the receptacles there may be detachable steps 36 or alternatively one or more partitioned receptacles similar to 35 may extend across the whole width of the vehicle and be formed partly or wholly with a stepped formation to provide convenient means of access into the vehicle. This area can be covered with a flat detachable decking to provide a level floor throughout the body if required.

Fig. 5 shows an alternative arrangement of the levers 18 in which the triangular form depends below the pivots 19 in the upstanding position of the rods 21. This may be advantageous in providing for convenient location of the pivots 19 or convenient positioning of the clips 23 when the pivoted assembly is in lowered position.

The apparatus may be employed equally well for loading or unloading heavy articles to be rested on the floor of a vehicle body in which case it may be convenient so to arrange the pivoted assembly that articles may be applied to the supporting means outside the vehicle and then swung upwardly and inwardly to a greater extent than in the case of the arrangement of Figs. 1 to 3. Figure 6 shows such an arrangement and it will be seen that triangular levers 40 have rods 41 associated with them in similar manner to the relationship between the rods 21 and levers 18 but in the horizontal attitude of the rods 41 the triangular levers 40 extend above the pivot 19. The pulleys 25 will in this case be located further forward within the vehicle body so as to lie above the position of the rods 41 when in their vertical or nearly vertical attitude, but preferably slightly rearwardly of the pivot 19. In loading operations the ropes or chains are hauled to swing the clips 23 upwardly and inwardly to carry articles supported by them above the floor of the body and move them within said body until the rods 41 are in substantially vertical attitude. The rope or chain is then released to permit the rods 41 to slide downwardly in the levers 40 to deposit the articles on the floor of the body.

It will readily be appreciated that a similar arrangement of a swinging assembly with supporting clips could be employed in production operations wherein the articles are transported along an overhead conveyor rail and are required to be lowered from said rail for processing, for example painting or spraying and afterwards raised to return them to the conveyor rail or rails.

Figures 7 and 8 illustrate a modified arrangement operating in substantially the same manner as that of Figs. 1 to 3 but having the two swingable arms carrying the cross bar for the supporting means mounted on a form of parallel linkage to provide for their up and down movement when in upstanding attitude. In Figs. 7 and 8 also the arm or arms and their supporting means are mounted on pivots provided with reinforced mountings. The arms are indicated at 50 as being of tubular form and connected at their free ends by elbows 51 to a tubular cross bar 52 on which spaced supporting means 53 are carried. Towards the ends of the arms 50 which are to be lowermost in the upstanding attitude spaced collars 54 are secured to each arm and are pivoted at 55 to short tubular members 56 forming substantially parallel members of the parallel linkage. The opposite ends of the members 56 have collars 57 pivoted at 58 to a short tubular member 59 which may be fixed or slidable in a sleeve like end portion 60 on a supporting lever 61. The latter is pivoted centrally about a horizontal axis by means of an apertured bearing member 62 engaging around a pivot pin 63 and has beyond its pivot as shown in Fig. 7 an upwardly directed portion 64 carrying a stop member 65 which limits the pivotal movement of links 56 in one direction about the pivots 58. The mechanism of Figs. 7 and 8 is intended for mounting inside the body of a goods vehicle or container near a loading aperture and it will be understood that precisely similar lever arrangements are provided at opposite sides and associated respectively with the arms 50 which support the cross bar 52. The pivot pins 63 at opposite sides are disposed in alignment and each projects inwardly from a mounting foot 66, Fig. 8, secured to the adjacent side wall of the vehicle body or container and is braced by an upstanding tube 67 connected to it by a junction piece 68 reaching to an inverted foot 69 secured to the roof of the body or container. Towards the free ends of the arms 50 there are secured thereto anchorage plates 70 mounted on cleats 71 to which plates cables, ropes or chains 72 are attached for hoisting the arms 50 and cross bar 52. The cables, ropes or chains are drawn up and released simultaneously as required, by operation of winch mechanism as previously described.

The construction of Figs. 7 and 8 operates similarly to that of Figs. 1 to 3 the principal difference being that the arms 50 on being brought to upstanding attitude are permitted to be raised further by the swinging movement of the links 56 instead of by the arms sliding endwise directly in bearing mountings. The member 59 may be permanently fixed in its mounting 60 or adjustably secured in position therein or it may be freely slidable in said mounting, such adjustment or free sliding movement permitting a given set of equipment to be suitable for mounting in vehicle or container bodies of different heights. The stop members 65 correspond in function to the member 27 of Figs. 1 to 3 by co-operating with the upper links 56 as shown in Fig. 7.

If desired in the construction of Figs. 7 and 8 the links 56 may be rigidly coupled to the arms 50 and members 59 instead of being pivoted to them. In this case the members 59 are arranged to slide freely in the mountings 60 to permit the required up and down movement of the arms 50 when in upstanding attitude with the end collars on members 59 serving as stops to limit each up and down movement.

A cross bar similar to the cross bar 22 can of course carry any number of clips which may be closely or widely spaced to suit the particular purpose for which the apparatus is used.

What I claim is:

1. Load hoisting apparatus comprising a lever arrangement having two lever devices pivoted about a common substantially horizontal axis and spaced apart in the direction of said axis, an arm carried by each lever device so as to extend approximately at right angles to said common axis in a position displaced therefrom, with the arms on the two lever devices disposed approximately parallel to one another, a cross bar connecting the ends of the arms remote from said axis, means on the cross bar for supporting a load to be hoisted and operating means for swinging said lever and arm assembly about the pivot axis of the lever devices to move the arms between approximately horizontal and upstanding attitudes.

2. Apparatus according to claim 1 wherein the load supporting means on the cross bar is constituted by a plurality of supporting means at spaced intervals along the bar.

3. The combination with a vehicle body or transportable container of load hoisting apparatus according to claim 1 having means pivoting said two lever devices to opposite walls of the body or container close to a loading aperture with the lever devices so arranged that when the arms supported by them are lowered to an approximately horizontal attitude they project through the loading aperture to a position outside the body or container and when swung to an upstanding attitude they extend within the body or container.

4. Load hoising apparatus comprising a pair of laterally spaced arms, a load supporting cross bar connecting said arms between corresponding ends thereof, pivotal supporting means for the arms disposed towards their other ends to permit the arms and cross bar to swing about a substantially horizontal axis approximately parallel to the cross bar and in offset spaced relationship to the lines of said arms between a lowered position and a substantially vertically upstanding attitude, said pivotal supporting means permitting the arms and cross bar when upstanding to be movable bodily heightwise, and hoisting means for raising the arms and cross bar from the lowered position and for moving them heightwise when in the upstanding attitude.

5. The combination with a vehicle or container body of load hoisting apparatus according to claim 4 having the pivotal supporting means for the said arms carried on opposite walls of said body close to a loading aperture so that the arm and cross bar when lowered project through said aperture and when raised are contained within the body, and having runways at the upper part of said body on which goods can be slung for movement into and out of the interior of said body, said hoisting apparatus being so positioned that when the arms and cross bar are moved to upstanding attitude the cross bar is adjacent to the ends of the runways and upward bodily movement of the arms and cross bar causes the latter to be positioned so that goods carried thereby can readily be transferred to the runways.

6. A combination according to claim 5 comprising article supporting means disposed on the cross bar at positions corresponding to the positions of the runways and means whereby raising of the arms and cross bar with the arms in upstanding attitude causes articles suspended on the cross bar to be automatically transferred to the runways.

7. A combination according to claim 6 comprising load supporting members engageable with and removable from the respective runways only at an end thereof, carriers on the said cross bar for such supporting members arranged to present said members to the ends of the runways when the said arms are moved upwardly and latching means being releasable by upward movement of the arms when in upstanding attitude to permit transfer of the load supporting members between the said runways and carriers.

References Cited in the file of this patent

UNITED STATES PATENTS

| | | |
|---|---|---|
| 1,015,393 | Murphy | Jan. 23, 1912 |
| 1,464,131 | Goodger | Aug. 7, 1923 |
| 2,211,721 | Gerosa et al. | Aug. 13, 1940 |
| 2,442,549 | Pearlman | June 1, 1948 |
| 2,479,758 | McDermott | Aug. 23, 1949 |
| 2,513,355 | Peckinpaugh | July 4, 1950 |
| 2,758,730 | Tapp et al. | Aug. 14, 1956 |